United States Patent
Yokoi et al.

(10) Patent No.: US 6,923,415 B2
(45) Date of Patent: Aug. 2, 2005

(54) SEAT SLIDE DEVICE FOR VEHICLES

(75) Inventors: Kazuhiro Yokoi, Shizuoka (JP); Masaaki Yokota, Tokyo (JP)

(73) Assignees: Fuji Kiko Co., Ltd., Kosai (JP); Tachi-S Co., Ltd., Tokyo (JP)

( * ) Notice: Subject to any disclaimer, the term of this patent is extended or adjusted under 35 U.S.C. 154(b) by 23 days.

(21) Appl. No.: 10/732,311

(22) Filed: Dec. 11, 2003

(65) Prior Publication Data

US 2004/0118990 A1 Jun. 24, 2004

(30) Foreign Application Priority Data

Dec. 19, 2002 (JP) ........................................ 2002-367601

(51) Int. Cl.$^7$ .............................................. F16M 13/00
(52) U.S. Cl. ...................................... 248/424; 248/430
(58) Field of Search ................................ 248/424, 419, 248/423, 429, 430

(56) References Cited

U.S. PATENT DOCUMENTS

| | | | | |
|---|---|---|---|---|
| 3,711,057 A | * | 1/1973 | Marx | 248/430 |
| 4,563,044 A | * | 1/1986 | Rees | 384/18 |
| 4,804,229 A | * | 2/1989 | Nishino | 297/471 |
| 4,881,827 A | * | 11/1989 | Borlinghaus et al. | 384/47 |
| 5,172,882 A | * | 12/1992 | Nini | 248/430 |
| 5,234,189 A | * | 8/1993 | Myers | 248/429 |
| 5,676,341 A | * | 10/1997 | Tarusawa et al. | 248/430 |
| 5,918,846 A | * | 7/1999 | Garrido | 248/429 |
| 5,961,088 A | * | 10/1999 | Chabanne et al. | 248/429 |
| 6,155,626 A | * | 12/2000 | Chabanne et al. | 296/65.03 |
| 6,254,188 B1 | * | 7/2001 | Downey | 297/341 |
| 6,349,914 B1 | * | 2/2002 | Yoshida et al. | 248/429 |
| 6,637,712 B1 | * | 10/2003 | Lagerweij | 248/429 |
| 6,688,574 B2 | * | 2/2004 | Okazaki et al. | 248/424 |
| 2002/0060281 A1 | | 5/2002 | Okazaki et al. | |
| 2003/0230696 A1 | * | 12/2003 | Yamada et al. | 248/424 |

FOREIGN PATENT DOCUMENTS

JP       2002-154356 A       5/2002

* cited by examiner

*Primary Examiner*—Anita M. King
(74) *Attorney, Agent, or Firm*—Foley & Lardner LLP

(57) ABSTRACT

A seat slide device for a vehicle is provided which comprises a lower rail, an upper rail and a lock mechanism for releasably locking the upper rail to the lower rail. The lock mechanism includes one or more locking fingers pivotally installed on an upper rail side, a plurality of engaged portions provided to a lower rail side, and a biasing unit for urging the one or more locking fingers in the direction to engage a corresponding number of the engaged portions. The one or more locking fingers and the biasing unit are disposed within a space between the upper rail and the lower rail. The lock mechanism further includes a lock plate having the engagement portions. The lock plate is an independent part, disposed within the space and secured to the lower rail.

18 Claims, 4 Drawing Sheets

SEAT SLIDE DEVICE FOR VEHICLES

BACKGROUND OF THE INVENTION

The present invention relates to a seat slide device for vehicles and more specifically to a lock mechanism of the seat slide device.

In these days, a vehicle seat is increasingly required to be capable of changing its layout variously, so that not only a front seat but a second seat, third seat and the like are provided with seat slide devices. Thus, the seat slide device is required to be disposed under various restrictions, for example, to be embedded in a floor surface of a vehicle or to be disposed within a restricted space.

For this reason, in order to attain disposition of the seat slide device under such a severe condition, it has heretofore been proposed a seat slide device wherein a lock mechanism is disposed in a space between a lower rail on a vehicle floor side and an upper rail on a seat side, so that the lock mechanism does not have any portion protruding outward from the upper rail.

A brief description being made to the seat slide device, the lock mechanism includes a locking finger swingably installed on a lower end of one upper rail side wall. The locking finger is bent so as to have an end portion extending from the inside of the upper rail toward the above-described one upper rail side wall. The end portion of the locking finger further extends through an engagement hole formed in the above-described one upper rail side wall and engaged in an engagement hole (engaged portion) formed in a lower rail side wall at any arbitrary position thereof. The locking finger is urged by a spring disposed inside the upper rail in the direction to engage the engagement holes. In case of unlocking of the lock mechanism, the locking finger is adapted to swing against the bias of the spring. Namely, during the time an unlocking operation of the locking fingers is not performed, the locking finger extends from the inside of the upper rail to the outside thereof and is thereby engaged in the engagement holes provided to the upper rail side wall and the lower rail side wall. By an unlocking operation carried out by means of a release lever, the locking finger is released from engagement with the lower rail. In the meantime, the lower rail is provided with a plurality of engagement holes that are arranged in a range within which the slide position of the upper rail can be changed relative to the lower rail.

Accordingly, in the seat slide device, the locking mechanism is almost disposed inside the upper rail and the lower rail and is therefore not protruded outside therefrom. As a result, an effective space can be retained at a location outside the upper rail, thus enabling the seat slide device to be disposed in a restrictive vehicle space with ease.

SUMMARY OF THE INVENTION

However, since the prior art seat slide device is structured so that the engagement holes for engagement with the locking finger are formed in the side wall of the lower rail, application of the seat slide device to a seat of a different specification such as a different slide range requires a different lower rail that is produced separately, thus causing a problem of a poor productivity.

Further, the prior art seat slide device requires a plurality of engagement holes (engaged portions) to be formed in the side wall of the lower rail so as to be arranged in the longitudinal direction thereof, causing a problem of the rigidity of the lower rail being lowered.

It is accordingly an object of the present invention to provide a seat slide device that makes it possible to eliminate an outward protrusion of a lock mechanism from the upper rail while making it possible to improve the productivity and the rigidity of the lower rail.

To achieve the above object, there is provided according to an aspect of the present invention a seat slide device for a vehicle comprising a lower rail, an upper rail slidably mounted on the lower rail, and a lock mechanism for releasably locking the upper rail to the lower rail, the lock mechanism including one or more locking fingers pivotally installed on an upper rail side and a plurality of engaged portions provided to a lower rail side, wherein the one or more locking fingers are disposed in a space between the upper rail and the lower rail, and wherein the lock mechanism further includes a lock plate having the engaged portions, the lock plate being an independent part, disposed within the space and secured to the lower rail.

According a further aspect of the present invention, there is provided a seat slide device for a vehicle comprising a lower rail adapted to be connected to a vehicle floor, an upper rail adapted to carry a vehicle seat and slidably mounted on the lower rail, and a lock mechanism for releasably locking the upper rail to the lower rail, the lock mechanism including one or more locking fingers pivotally installed on an upper rail side, a plurality of engaged portions provided to a lower rail side and arranged in the longitudinal direction of the lower rail, a biasing unit for urging the one or more locking fingers in the direction to engage a corresponding number of the engaged portions, wherein the one or more locking fingers and the biasing unit are disposed within a space between the upper rail and the lower rail, and wherein the lock mechanism further includes a lock plate having the engaged portions, the lock plate being an independent part, disposed in the space and secured to the lower rail.

DESCRIPTION OF THE PREFERRED EMBODIMENT

Figure 1:
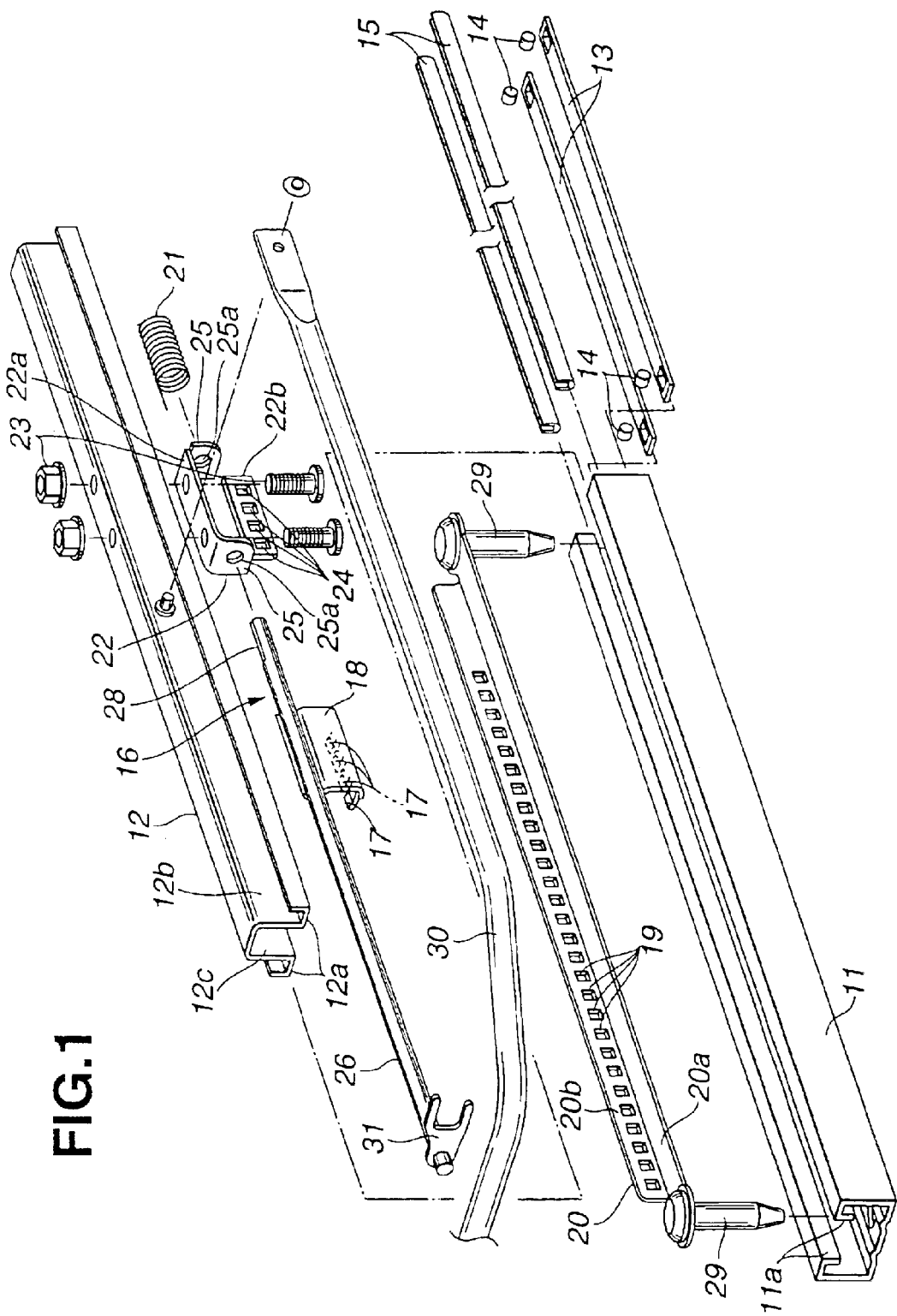
FIG. 1 is an exploded view of a seat slide device according to an embodiment of the present invention.
Figure 2:
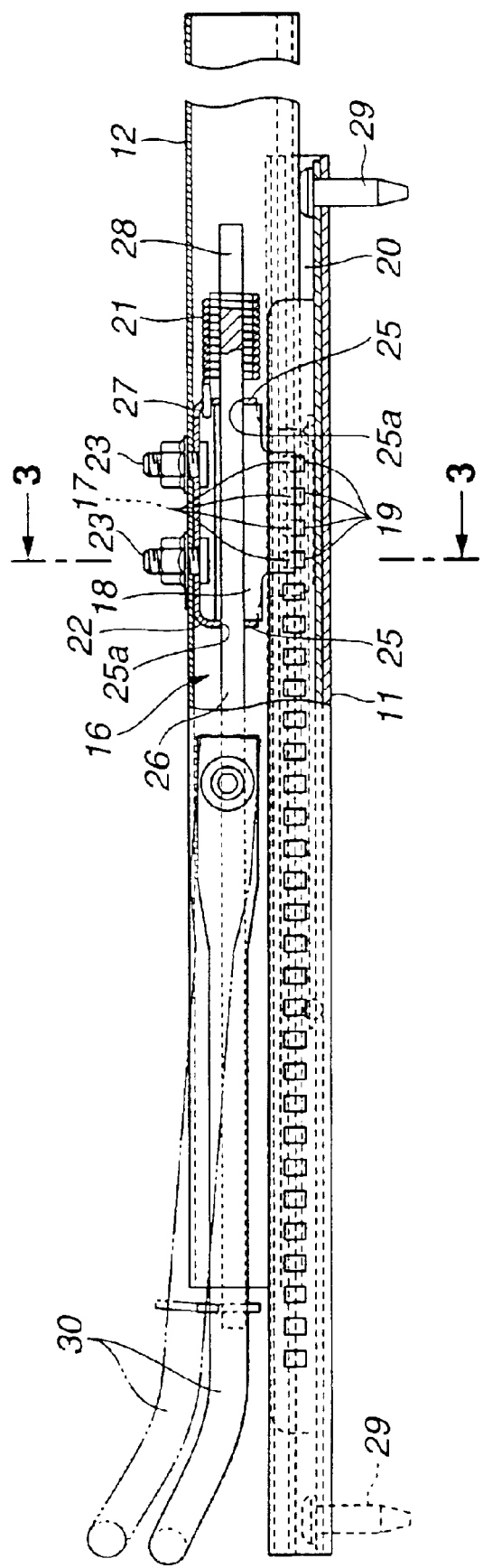
FIG. 2 is a partly sectional, side elevational view of the seat slide device of FIG. 1.

Referring first to FIGS. 1 and 2, a seat slide device includes a lower rail 11 adapted to be connected to a vehicle floor (not shown) and an upper rail 12 adapted to be connected to a vehicle seat (not shown) and slidably mounted on the lower rail 11. The rails 11, 12 are assembled by interposing therebetween a plurality of rollers 14 that are held by brackets 13 and sliders 15 made of a low friction material such as resin.

More specifically, the lower rail 11 has a nearly U-shaped cross section and includes a pair of vertical side walls 11b, 11c and a bottom wall 11d. The side walls 11b, 11C have at the upper ends thereof (open side end portions) L-shaped inward and downward bent portions 11a, respectively. The upper rail 12 has an inverted, nearly U-shaped cross section and includes a pair of vertical side walls 12b, 12c and an top wall 12d. The side walls 12b, 12c have at the lower ends (open side end portions) thereof L-shaped outward and upward bent portions 12a, respectively. On the vertical end section of each bent portion 11a of the lower rail 11 is fitted the slider 15 that extends longitudinally of the lower rail 11. The lower rail 11 and upper rail 12 are assembled in such a manner that the vertical end section of each bent portion 11a of the lower rail 11 and the slider 15 fitted thereon are interposed between the vertical end section of each bent portion 12a of the upper rail 12 and one of the side walls 12b, 12c that is located opposite to the vertical end section of the bent portion 12a. Further, the brackets 13 are fixedly attached to the inner surfaces of the side walls 11b, 11c of the lower rail 11, respectively, so that each bracket 13 rotatably supports the rollers 14 which in turn rollingly supports each bent portion 12a of the upper rail 12.

Between the upper rail 12 and the lower rail 11 structured as described above is provided a lock mechanism 16 for releasably locking the upper rail 12 to the lower rail 11 after adjustment of the seat slide position. The lock mechanism 16 is swingably supported on the upper rail 12 side and includes a latch plate 18 having a nearly L-shaped cross section and having at an end portion thereof a plurality of locking fingers 17, a lock plate 20 having a plurality of engagement holes (engaged portions) 19 that are releasably engageable with the locking fingers 17 of the latch plate 18, a coil spring (i.e., biasing means or unit) 21 that urges the latch plate 18 in the direction to engage the engagement holes 19 and a finger supporting plate 22 that supports the locking fingers 17 that protrude from the engagement holes 19 of the lock plate 18 in case of locking of the lock mechanism 16.

The finger supporting plate 22 has a generally L-shaped cross section that is made by a plane perpendicular to the longitudinal direction of the upper rail 12. The finger supporting plate 22 has a base wall 22a that constitutes one side of the L-shape and is secured to a longitudinally central portion of a top wall 12d of the upper rail 12 by means of two pairs 23 of bolts and nuts. The finger supporting plate 22 further has a vertical wall 22b that constitutes another side of the L-shape and is disposed adjacent one side wall 12b of the upper rail 12. The vertical wall 22b is extended longitudinally of the upper rail 12 and has at a lower end portion thereof a plurality of support holes 24 in which the locking fingers 17 of the latch plate 18 are engaged. Further, the finger supporting plate 22 has at the longitudinally opposite ends of the base wall 22a a pair of vertical bent walls 25 that are formed with circular support holes 25a, respectively.

The latch plate 18 is formed into a nearly L-shape in section as described above and is connected to a support rod 26 to constitute an integral unit. The support rod 26 is disposed inside the upper rail 12 so as to extend through the support holes 25a of the bent walls 25a of the finger supporting plate 22. The support rod 26 extends from the finger support plate 22 to the front end portion of the upper rail 12 and is rotatably supported on the upper rail 12 by way of a bracket (not shown) attached to the front end portion of the upper rail 12 and the finger supporting plate 22. Accordingly, in this embodiment, the bent walls 25 of the finger supporting plate 22 constitute an integral bearing portion that pivotally supports the latch plate 18 (locking fingers 17). Pivotal movement or swinging of the latch plate 18 together with the support rod 26 causes the locking fingers 17 to pivot or swing in the widthwise direction of the upper rail 12.

Further, the coil spring 21 is installed on a rear end side outer circumferential portion of the support rod 26 and has an end engaged in a notch 27 formed in the finger supporting plate 22 and another end engaged in a slit 18 formed in a rear end portion of the support rod 26. Accordingly, the support rod 26 and the latch plate 28 receives a biasing force from the coil spring 21 so as to be urged in a rotational direction. The biasing direction is the direction to push the end portions of the locking fingers 17 toward the vertical wall 22b of the finger supporting plate 22.

On the other hand, the lock plate 20 is formed into a nearly L-shape in section except for the longitudinal front and rear end portions thereof and is elongated so as to extend over a predetermined longitudinal range of the lower rail 11. The base wall 20a of the lock plate 20 constituting one side of the L-shape is secured to a widthwise central portion of the bottom wall 11d of the lower rail 11 by spot welding, projection welding or the like. The lock plate 20 has at the opposite longitudinal ends of the base wall 20a anchor walls (no numeral) through which anchor blots 29 passes. The lower rail 11 is also adapted to allow the anchor bolts 29 to pass through. The anchor walls are secured to a vehicle floor (not shown) together with the lower rail 11 by means of the anchor bolts 29 when the seat slide device is installed on the vehicle floor.

Further, the vertical wall 20b of the lock plate 20 constituting another side of the L-shape is formed with the above-described plurality of engagement holes 19 that are provided over almost all of the longitudinal extent of the lock plate 20. The vertical wall 20b is disposed so as to be adjacently opposite to the vertical wall 22b of the finger supporting plate 22. The engagement holes 19 of the vertical wall 20b are the portions in which the locking fingers 17 of the latch plate 18 are engaged, so that the pitch of the locking holes 19 is equal to that of the locking fingers 17.

Further, on the outside of the upper rail 12 is disposed a towel bar type control lever 30 that is swingably or pivotally attached at one end thereof to the other side wall 12c of the upper rail 12. The control lever 30 has a forward lateral portion that is engaged with the support rod 26. More specifically, to the end portion of the support rod 26 that protrudes from the front end portion of the upper rail 12 is attached a nearly U-shaped linkage arm 31 to constitute an integral unit. To the U-shaped portion of the linkage arm 31 is attached swingably and reciprocally the control lever 30. Accordingly, when the front end portion side of the control lever 30 is operated so as to swing up and down, swinging of the control lever 30 is translated by way of the linkage arm 31 into rotation of the support rod 26 and the latch plate 18. In the meantime, the control lever 30 is operatively connected at another end thereof to a similar seat slide device described as above, in a similar manner.

Figure 3:
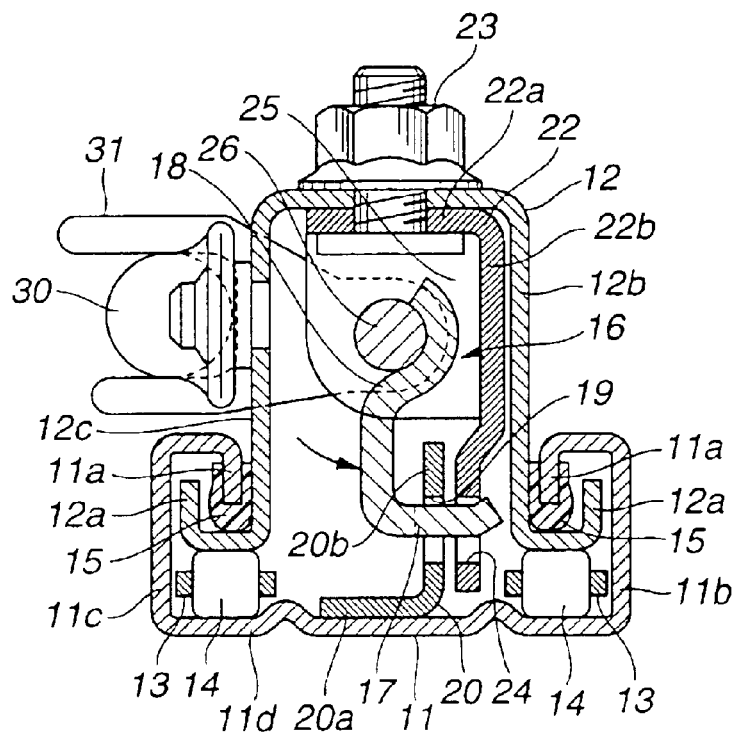
FIG. 3 is a sectional view taken along the line 3—3 of FIG. 2 and shows the seat slide device in a locked condition.
Figure 4:
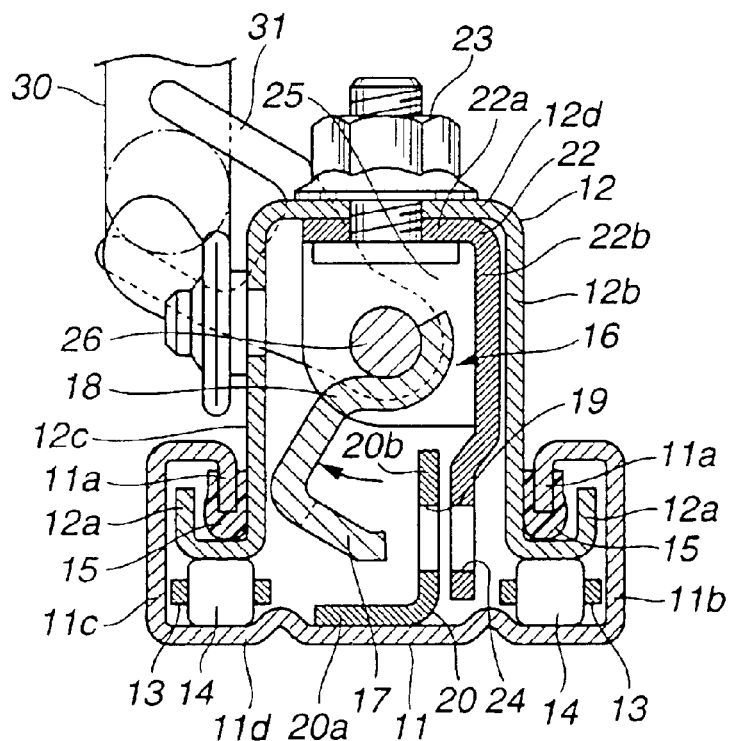
FIG. 4 is a view similar to FIG. 3 but shows the seat slide device in an unlocked condition.

Since the seat slide device is structured as described above, when the seat (not shown) is locked in a certain position, the latch plate 18 is turned toward the lock plate 20 under the bias of the coil spring 21 (refer to FIGS. 1 and 2) as shown in FIG. 3. At this time, the locking fingers 17 of the latch plate 18 is engaged in both of the engagement holes 19 of the lock plate 20 and the support holes 24 of the finger supporting plate 22.

In case the slide position of the seat is to be changed, the control lever 30 is pulled up, thus causing the latch plate 18 to turn against the bias of the coil spring 21. This causes the locking fingers 17 of the latch plate 18 to be pulled off from the support holes 24 of the finger supporting plate 22 and the engagement holes 19 of the lock plate 20, thus enabling the seat to slide freely. Under this condition, the slide position of the seat is changed as desired. Thereafter, the control lever 30 is released from being pulled up, thus allowing the latch plate 18 to return to the previous position under the bias of the coil spring 21. At this time, the locking fingers 17 are engaged in both of the engagement holes 19 and the support holes 24, thus causing the seat slide device to be put in a locked condition again.

As having been described above, almost all of the elements of the lock mechanism 16 are disposed within a space between the upper rail 12 and the lower rail 11 or in a space surrounded by the upper rail 12 and the lower rail 11. Thus, the elements of the lock mechanism 16 are assuredly prevented from interfering with the adjacent members of the seat slide device at the time of an operation for causing the seat to slide, thus enabling to utilize a space outside the upper rail 12 effectively.

Further, in the seat slide device of this embodiment, the engagement holes (engaged portions) 19 in which the locking fingers 17 on the upper rail 12 side are engaged in case of locking of the lock mechanism 16 are formed in the lock plate 20 that is a part independent from the lower rail 11. Thus, in case of application of the seat slide device to a seat having a different specification such as a different seat slide range, it is only the lock plate 20 that is required to be replaced. This is a great advantage. Further, since the lower rail 11 is not formed with the engaged portions such as the engagement holes, there can be attained another advantage that the lower rail 11 can have an improved rigidity.

Further, in the seat slide device of this embodiment, the end portions of the locking fingers 17 are engaged in the support holes 24 of the finger supporting plate 22, thus making it possible to prevent the latch plate 18 from being twisted or distorted. The finger support plate 22 in which the support holes 24 are formed is an independent part that is independent from the upper rail 12. Thus, in case the seat slide device is applied to a seat having a different lock pitch, the latch plate 18 and the finger supporting plate 22 need to be replaced together with the lock plate 20 but the upper rail 12 and the lower rail 11 can be commonly used in most cases. Further, by comparison with an upper rail that is formed with support holes, the upper rail 12 can be improved in the rigidity.

Further, in the seat slide device of this embodiment, the end walls 25 for rotatably supporting the support rod 26 are formed integral with the finger supporting plate 22. Thus, by comparison with the case where independent support members for rotatably supporting the support rod 16 are prepared and attached to the upper rail 12, the number of necessary parts of the seat slide device can be decreased and moreover an advantage that the accuracy in the positions of the locking fingers 17 of the latch plate 18 and the support holes 24 of the finger supporting plate 22 relative to each other can be improved.

Figure 5:
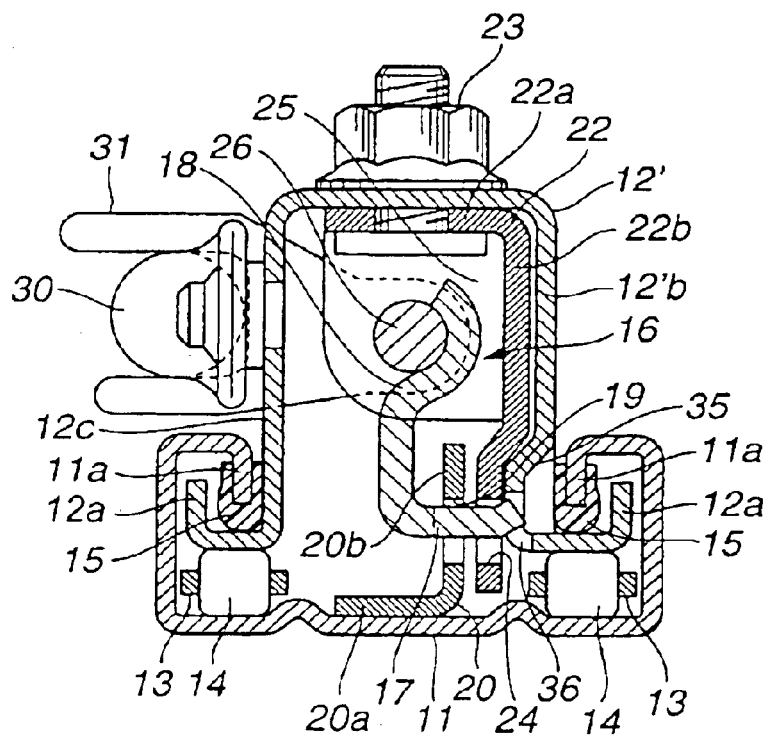
FIG. 5 is a view similar to FIG. 3 but shows a second embodiment.
Figure 6:
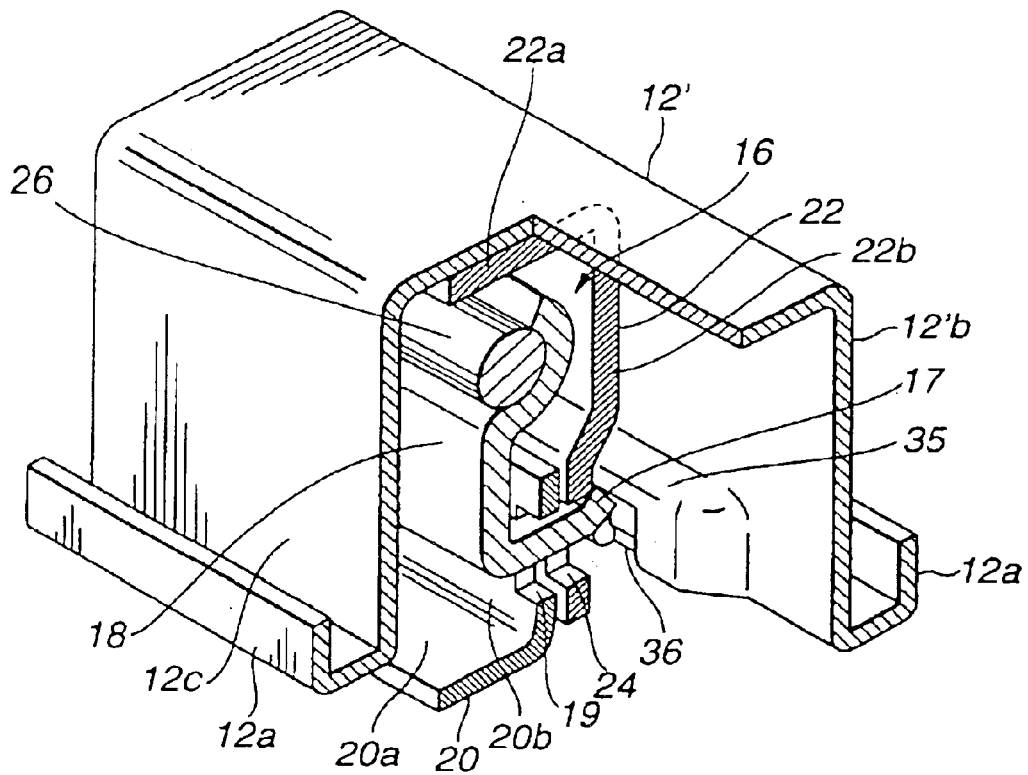
FIG. 6 is a fragmentary, partly cutaway, perspective view of a seat slide device of FIG. 5.

Then, the seat slide device according to the second embodiment of the present invention will be described with reference to FIGS. 5 and 6 in which like reference characters to those of the previous embodiment described with reference to FIGS. 1 to 4 are designated by like reference characters and repeated description thereto is omitted for brevity.

This seat slide device of this embodiment is substantially similar in the general base structure to the first embodiment except that the side wall 12'b of the upper rail 12' has at a position opposite to the support holes 24 of the finger supporting plate 22 a recessed portion 35 that is recessed toward the vertical wall 22b of the finger supporting plate 22. The recessed portion 35 is formed with support holes 36 at corresponding positions to the support holes 24.

In the support holes 36 of the recessed portion 35 are engaged the end portions of the locking fingers 17 that pass through the support holes 24 of the finger supporting plate 22 in case of locking of the lock mechanism 16. The support holes 36 of the recessed portion 35 thus constitute, together with the support holes 24 of the finger supporting plate 22, an additional finger support portion that supports the end portions of the locking fingers 17.

Accordingly, the seat slide device of this embodiment can attain the similar effect to that of the first embodiment and furthermore can have such an advantage that by the effect of the support holes 24, 36 of the finger supporting plate 22 and the upper rail 12' twisting or distortion of the locking fingers 17 (latch plate 18) can be prevented more assuredly. Further, since the upper rail 12' is formed with the recessed portion 35 and the support holes 36 are formed in the recessed portion 35, the amount by which the locking fingers 17 protrude outward from the side wall 12'b can be made smaller while at the same time it becomes possible to attain an assured engagement of the locking fingers 17 with the support holes 36. For this reason, the seat slide device of this embodiment is free from such a disadvantage that the end portions of the locking fingers 17 interfere with other members such as the slider 15 at the time of locking of the lock mechanism 16, thus making it possible to attain smooth and assured locking and unlocking operations.

However, in the seat slide device of this embodiment, since the upper rail 12' is formed with the recessed portion 35 and the support holes 36 only at one side wall 12'b thereof, the upper rails 12' to be disposed respectively on the right-hand side and the left-hand side of the seat cannot be used commonly. In this connection, by forming the recessed portion 35 and the support holes 36 on both of the side walls 12'b, 12c of the upper rail 12', the upper rails 12' to be disposed on the left-hand side and the right-hand side of the seat can be commonly used.

The entire contents of Japanese Patent Applications P2002-367601(filed Dec. 19, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the embodiments have been described with respect to the case where the engaged portion of the lock plate 20 and the finger support potion of the finger supporting plate 22 are constituted by the holes 19 and the holes 24, respectively, they can be constituted by grooves. Further, the biasing means for urging the locking fingers 17 in the direction to lockingly engage the upper rail 12' and the lower rail 11 is not limited to the coil spring 21 but can be constituted by another spring such as a leaf spring. Further, while the embodiments have been described with respect to the case where the finger supporting plate 22 is attached to the top wall 12d, it can be attached to the side wall 12b or 12c. Further, while the locking fingers 17 (latch plate 18) have been described and shown as being supported on the upper rail 12 by way of the finger supporting plate 22, they can be supported on the upper rail 12 by way of a bracket or the like independently from the finger supporting plate 22. The scope of the invention is defined with reference to the following claims.

What is claimed is:

1. A seat slide device for a vehicle, comprising:
   a lower rail;
   an upper rail slidably mounted on the lower rail; and
   a lock mechanism for releasably locking the upper rail to the lower rail;
   the lock mechanism including one or more locking fingers pivotally installed on an upper rail side and a plurality of engaged portions provided to a lower rail side;
   wherein the one or more locking fingers are disposed within a space between the upper rail and the lower rail;
   wherein the lock mechanism further includes a lock plate having the engaged portions, the lock plate being an independent part, disposed within the space and secured to the lower rail; and
   wherein the lower rail is generally U-shaped in section and has a bottom wall and a pair of side walls, the lock plate being L-shaped in section and having a base wall attached to the bottom wall of the lower rail and a vertical wall having the engaged portions.

2. A seat slide device according to claim 1, wherein the lock mechanism further comprises biasing means for urging the one or more locking fingers in the direction to engage a corresponding number of the engaged portions, the biasing means being disposed within the space.

3. A seat slide device according to claim 2, wherein the lock mechanism further comprises a finger supporting plate for supporting the one or more locking fingers in case of engagement of the one or more locking fingers with the corresponding number of the engaged portions, the finger supporting plate being an independent part, disposed within the space and secured to the upper rail.

4. A seat slide device according to claim 3, wherein the finger supporting plate comprises an integral bearing portion that pivotally supports the one or more locking fingers.

5. A seat slide device according to claim 3, wherein the lock mechanism further comprises an additional finger supporting portion that is formed in the upper rail and supports the one or more locking fingers in case of engagement of the one or more locking fingers with the corresponding number of the engaged portions.

6. A seat slide device according to claim 4, wherein the lock mechanism further comprises a support rod rotatably installed on the bearing portion of the finger supporting plate and a latch plate having the one or more locking fingers and installed on the support rod to swing together therewith, the support rod and the latch plate being disposed within the space.

7. A seat slide device according to claim 4, wherein the upper rail is generally inverted U-shaped in section and has a top wall and a pair of side walls, the finger supporting plate being generally L-shaped in section and having a base wall attached to the top wall of the upper rail and a vertical wall having one or more support holes which correspond in number to the one or more locking fingers and in which the one or more locking fingers are engaged in case of engagement of the one or more locking fingers with the corresponding number of the engaged portions.

8. A seat slide device according to claim 5, wherein the additional finger supporting portion of the lock mechanism comprises a recessed portion provided to one of the side walls of the upper rail, the recessed portion being recessed toward the vertical wall of the finger supporting plate and formed with one or more support holes which correspond in number to the one or more locking fingers and in which the one or more locking fingers are engaged in case of locking of the upper rail to the lower rail.

9. A seat slide device for a vehicle, comprising:
   a lower rail adapted to be connected to a vehicle floor;
   an upper rail adapted to carry a vehicle seat and slidably mounted on the lower rail; and
   a lock mechanism for releasably locking the upper rail to the lower rail;
   the lock mechanism including one or more locking fingers pivotally installed on an upper rail side, a plurality of engaged portions provided to a lower rail side and arranged in the longitudinal direction of the lower rail, a biasing unit for urging the one or more locking fingers in the direction to engage a corresponding number of the engaged portions;
   wherein the one or more locking fingers and the biasing unit are disposed within a space between the upper rail and the lower rail;
   wherein the lock mechanism further includes a lock plate having the engaged portions, the lock plate being an independent part, disposed within the space and secured to the lower rail, and
   wherein the lower rail is generally U-shaped in section and has a bottom wall and a pair of guide walls, the lock plate being L-shaped in section and having a base wall attached to the bottom wall of the lower rail and a vertical wall having the engaged portions.

10. A seat slide device according to claim 9, wherein the lock mechanism further comprises a finger supporting plate for supporting the one or more locking fingers in case of engagement of the one or more locking fingers with the corresponding number of the engaged portions, the finger supporting plate being an independent part, disposed within the space and secured to the upper rail.

11. A seat slide device according to claim 10, wherein the finger supporting plate comprises an integral bearing portion that pivotally supports the one or more locking fingers.

12. A seat slide device according to claim 10, wherein the lock mechanism further comprises an additional finger supporting portion that is formed in the upper rail and supports the one or more locking fingers in case of engagement of the one or more locking fingers with the corresponding number of the engaged portions.

13. A seat slide device according to claim 12, wherein the engaged portions comprises engagement holes in which the one or more locking fingers are engaged in case of locking of the upper rail to the lower rail.

14. A seat slide device according to claim 13, wherein the lock mechanism further comprises a support rod rotatably installed on the bearing portion of the finger supporting plate and a latch plate having the one or more locking fingers and installed on the support rod to swing together therewith, the support rod and the latch plate being disposed within the space.

15. A seat slide device according to claim 14, wherein the upper rail is generally inverted U-shaped in section and has a top wall and a pair of side walls, the finger supporting plate being generally L-shaped in section and having a base wall attached to the top wall of the upper rail and a vertical wall having one or more support holes which correspond in number to the one or more locking fingers and in which the one or more locking fingers are engaged in case of engagement of the one or more locking fingers with the corresponding number of the engagement holes.

16. A seat slide device according to claim 9, wherein the vertical wall of the lock plate is disposed adjacently opposite to the vertical wall of the finger supporting plate.

17. A seat slide device according to claim 11, wherein the finger supporting plate comprises a base wall, and the bearing portion of the finger supporting plate comprises a pair of integral bent walls provided to opposite longitudinal ends of the base wall.

18. A seat slide device according to claim 12, wherein the additional finger supporting portion of the lock mechanism comprises a recessed portion provided to one of the side walls of the upper rail, the recessed portion being recessed toward the vertical wall of the finger supporting plate and formed with one or more support holes which correspond in number to the one or more locking fingers and in which the one or more locking fingers are engaged in case of locking of the upper rail to the lower rail.

* * * * *